(12) United States Patent
von Mueller et al.

(10) Patent No.: US 7,509,499 B2
(45) Date of Patent: Mar. 24, 2009

(54) SECURE TOKEN ACCESS DISTRIBUTED DATABASE SYSTEM

(75) Inventors: Clay von Mueller, San Diego, CA (US); Kyle R. Zaidain, Half Moon Bay, CA (US)

(73) Assignee: Semtek Innovative Solutions Corporation, San Diego, CA (US)

( * ) Notice: Subject to any disclaimer, the term of this patent is extended or adjusted under 35 U.S.C. 154(b) by 639 days.

(21) Appl. No.: 10/365,051

(22) Filed: Feb. 12, 2003

(65) Prior Publication Data

US 2004/0006699 A1  Jan. 8, 2004

Related U.S. Application Data

(60) Provisional application No. 60/356,208, filed on Feb. 12, 2002.

(51) Int. Cl.
- H04K 1/00 (2006.01)
- G06F 11/30 (2006.01)
- G06F 7/04 (2006.01)

(52) U.S. Cl. ........................................ 713/185; 726/20
(58) Field of Classification Search ................. 713/185; 726/20

See application file for complete search history.

(56) References Cited

U.S. PATENT DOCUMENTS

| 5,657,389 | A  * | 8/1997  | Houvener ................... 713/186 |
| 5,708,422 | A  * | 1/1998  | Blonder et al. ............. 340/5.41 |
| 5,930,794 | A  * | 7/1999  | Linenbach et al. .......... 707/100 |
| 6,105,011 | A  * | 8/2000  | Morrison, Jr. ................ 705/45 |
| 6,957,338 | B1 * | 10/2005 | Sumino ....................... 713/186 |
| 7,013,393 | B1 * | 3/2006  | Stevens ....................... 235/380 |
| 7,103,575 | B1 * | 9/2006  | Linehan ........................ 705/64 |
| 2001/0047355 | A1 * | 11/2001 | Anwar ............................ 707/5 |
| 2002/0046338 | A1 * | 4/2002  | Ueda et al. ................... 713/168 |
| 2002/0145051 | A1 * | 10/2002 | Charrin ....................... 235/492 |
| 2003/0061156 | A1 * | 3/2003  | Lim ............................. 705/39 |

* cited by examiner

*Primary Examiner*—Christopher J Brown
(74) *Attorney, Agent, or Firm*—Sheppard Mullin Richter & Hampton LLP

(57) ABSTRACT

A secure token access distributed database system to provide verification of someone's or something's identity quickly and securely is provided, wherein such database and system is readily scalable from local to nationwide to worldwide use. The system specifically addresses the use of an authenticated user identification (ID) where any accepted authentication scheme can be employed in combination with a number of secure enabled databases connected by any means, including LAN, WAN, Internet, and dedicated lines, to provide value-added data in real-time at the main point of security contact. Furthermore, the instant invention provides a concept by which a potentially unlimited number of secure enabled databases containing various kinds of data potentially useful to a requesting entity, are either connected by some network means, or exposed to the Internet through a secure connection. Data transfer may also be bi-directional. As part of the security incident information exchange, data may not only be received by the requesting entity, but the provider database may also receive updated information. Requests may be progressive in nature. Data contained in a response from one database may cause the requesting application to send out a new, modified request for the ID based on that data. Moreover, continual update of the incident data may continue even after sufficient information has been received to make a security decision, e.g., grant entry. If subsequent data arrives that could affect that decision, it may provide authorities and security personnel with timely data and an opportunity for appropriate and effective action.

38 Claims, 13 Drawing Sheets

MODULE 1

SEMTEK Secure Card ID Access/Entry Control
Flow Chart

SECURE TOKEN ACCESS DISTRIBUTED DATABASE SYSTEM

CROSS-REFERENCE TO RELATED APPLICATIONS

This application claims the benefit of U.S. Provisional Application Ser. No. 60/356,208 filed on Feb. 12, 2002.

BACKGROUND OF THE INVENTION

1. Field of the Invention

The present invention relates to a new and improved secure token access distributed database and system for using same, more specifically, the present invention relates to a new and improved secure token access distributed database system to provide verification of someone's or something's identity quickly and securely, wherein such database and system is readily scalable from local to nationwide to worldwide use.

2. Description of the Related Art

There is a pressing continuously present need to provide verification of someone's or something's identity quickly and securely. Routinely such tokens as a driver's license, employee badge, or a credit card are used to verify identity and grant access to privileges. The granter of such privileges is basing access on the validity of the token. These tokens have been shown to be vulnerable to various forms of forgery and attack, including theft. In fact, today over 47% of all fraud involves some sort of identity theft, usually in the form of credit card (or other token) fraud. Once privileges are granted based on a forged or stolen token, those privileges may be used in a detrimental fashion to compromise the system, process, or data accessed.

In addition many situations require immediate access to stored knowledge based on a user identity (ID) and optionally an individual's personal identification number (PIN). This data may provide security information regarding the ID or ID carrier, or it may be information conforming to a query defined by the application, the ID carrier, or both. A credit card or a bank's automatic teller machine (ATM) purchase transaction is one of numerous such circumstances where the data may provide security information regarding any token used for identification.

The relatively new area of data verification in wide area networks requires that a application running on a non-secure computer, for example a personal digital assistant (PDA), gain access to secure data (whether program or informational) while maintaining the security of the acquired data.

The secure data required by these applications may be distributed over many databases maintained and/or owned by varying authorities. MasterCard, Visa, state driver's license, social security, company employee records, and airline boarding database are a few of the databases that a single application may need to post requests for information. In addition each database has fields that the owner is willing to share and others, which are considered confidential. There is no current method to access a wide variety of data from diverse locations securely.

1. Verifiability of the User/user ID

Authenticity of Physical Medium: such as magnetic stripe (e.g., credit cards, ID cards, driver's licenses) or smart chip (also known as smart card) technology. In other words, how do we prove the ID (card, badge, etc.) is the original and not a copy?

Authenticity of the ID carrier/presenter: that is, is the ID carrier the correct, authorized user? If a PIN is used how do we prove the PIN has not been stolen?

2. Information (data)

Request Type. The request may be of any of several types: e.g., ID verification; additional or updated data regarding the ID or ID carrier; informational based on the requesting application type and/or a user formulated query.

Availability/Quantity of data depends on several factors. First, the amount of information associated with a given ID or informational query that has actually been stored in one or more storage devices (e.g., databases, files, smart chips, magnetic stripe, and paper). Second, accessibility to those storage devices (e.g., reports, dedicated connectivity, internet, magnetic or chip reader). Third, timeliness in obtaining the data (seconds, minutes, hours or days).

Access and Filtering of obtainable data (as defined above) is based on one or more of the following: 1) the requesting application type; 2) the verified ID, itself; 3) the authorization level of that ID; 4) The authorization level of the entity requesting authentication of the submitted ID (note that the ID of a requesting entity must, itself, be authenticated); and 5) the content and structure of an informational query.

Scenarios may Include the Following:

1. Customs officer at the border; Security Guard at a secure loading/unloading yard; federal, state or local police patrol officers engaged in a traffic stop—needs to verify the authenticity of a truck driver's license, his identity and his authorization to transport/load/unload a particular cargo.

2. Individual attempting to enter/access a secure area/building/room/data terminal.

3. Individual attempting to purchase goods or services using a credit device (e.g., credit card, debit card, smart chip, smart card)

4. Individual attempting a purchase by providing a credit application and ID (e.g., automobile).

5. Immigration/passport control at entry point to US (and potentially other client countries).

6. Researcher requesting restricted information from a secure database.

Currently Implemented Attempted Solutions

The current solutions to the basic problem are varied, but each is limited in scope.

Little or No Ability to Authenticate ID Media

Generally, a security system, whether it consists of a magnetic reader, a human "gate keeper" or both, either assumes the ID medium is valid, or subjects it to visual verification which is highly inaccurate if the medium is of valid type, but is not the original. (e.g., a false credit card usually contains a valid magnetic stripe visually and compositionally indistinguishable from an original, but carries magnetic data copied from a different card.)

Aside from the issue of insuring that a card or badge is not a fake, there are more general practical reasons for concern. In the case of badge access to areas, buildings, data terminal, etc., generally, a central database contains the encrypted code with access privilege data. When a badge is swiped the magnetic code on it is compared to the database to ensure it is a valid code before entry is granted. The database comparison is necessary because the badge and reader have no internal ability to authenticate the badge/code. Should the database, or the link to it, go down everyone is locked out until the database or link is repaired. If the locks use previously stored data to allow access a potential security hole is created. Either occurrence can be very costly in terms of lost work hours and unauthorized access.

Limited Ability (Easily Vulnerable to Compromise) to Verify Identity of an ID Carrier/presenter by Means Other than the Fact of Possession of the ID Medium.

Often some user input scheme or visual aid is the sole security check or is combined with a magnetic badge or human gatekeeper scheme to add more security "assurance" to a solution. This may consist of a PIN number that, presumably only the true card owner would know; a ZIP code associated with the billing address for the card; numbers printed on card that must be entered at the time of use. If the card/badge is being processed by a person ("gatekeeper"), a picture of the card owner on the card; a "non-reproducible" hologram; or the card owner signature (as examples) may be used, but this presupposes that the card has not been altered. All of these methods can be, and have been, suborned. PIN, ZIP and other numerical information can be observed, stolen or "hacked" from databases. Signatures can be forged. Copied cards can contain pictures of anyone. Non-reproducible holograms can, alas, be reproduced; at least to the extent that they can fool the human eye since general infrastructure does not exist to mechanically verify them.

Limited Insurance of Data Currency (Integrity) for Aid in Security Evaluations.

Current solutions are limited in their ability to address concerns regarding the currency and accuracy of the data available in a centralized database. There may be reasons, known to outside sources, why a given individual, even if his badge is authentic, should not be given access or at least should have access questioned. This poses a significant security risk, but currently, it is usually impractical or impossible to obtain or keep such information available and current for everyone that may seek access to a physical location or to restricted data. Reliance on a central database for current information can severely limit access to knowledge that may prove critical. Also, in many circumstances, the system is not flexible enough to handle a newly issued ID or an ID from an outside location that is, in fact valid, but not yet registered in a local database.

Smart Chip Technology

One of the limitations of current magnetic stripe technology is the relatively limited amount of data (approximately 64,000 bits or 64 Kb) that can be stored. On-card data useful in determining validity is likewise limited. Some current solutions look to smart chip technology. While it is true that significantly more data can be stored on a chip, the data, itself, is not necessarily more secure. As with magnetic stripe technology, PIN access to chip data can be observed or stolen and chips can be copied, and their encryption schemes broken.

In addition, chip technology is significantly more expensive per unit than magnetic stripe, and the infrastructure for chip access is not as ubiquitous and varies by manufacturer. If a chip encryption scheme is defeated, the cost of replacing the access technology (readers and writers) as well as the smart cards is prohibitively high.

Proposed Solutions

The proposed solutions use a combination of technologies to address the issues described in the above sections. These technology combinations depend on a number of factors, but can be application specific.

Card Authentication

The issue of card authentication is primarily addressed using Semtek Innovative Solutions, Inc. proprietary Secure Stripe™ (SS) technology covered in U.S. Pat. Nos. 5,770,846 and 6,260,146 (as well as pending U.S. patent applications Ser. Nos. 09/901,846 and 09/901,920 which have since been published as U.S. Patent Publication Nos. US 2002-0017559 A1 and US 2002-0017560 A1, respectfully). U.S. Pat. Nos. 5,770,846 and 6,260,146 (as well as pending U.S. patent applications Ser. Nos. 09/901,846 and 09/901,920) provide a means for establishing if a card is the original repository of a particular magnetic stripe data stream/segment, or is a copy. It does this by reading the "magnetic signature" of the magnetic media on the original card and encrypting it using a key or combination of keys that may be tied to the original writer and/or a PIN. This encrypted signature data is then added to the main data, which is also encrypted, and written to the stripe on the card. When the card is swiped in an SS reader, the magnetic signature of the current media is recorded. The stored signature in the magnetic stripe data stream/segment is decoded either using a public key known to the SS reader, a PIN entered by the card carrier, a PIN entered by a human monitor (e.g., sales clerk or security guard), or a combination, and is then compared to the current media signature just read. If signatures do not match, or keys fail decryption, the card is rejected and/or access is denied.

In another version rather than using a PIN number, which is prone to be forgotten, observed, or hacked (due to its limited range of values). A number of personal questions are asked when the card is first enabled. These questions are designed to be easily remembered by the user and not recorded or generally known. Examples of such questions may be: Do you like dogs? Do you like tattoos? The answers are used to generate a digital key and then discarded. During the verification process a random selection of one or more questions are asked. The answers are entered on a secure device such as a PIN pad, Secure Swipe PDA, or secure computer keyboard. The secure input device is required to prevent a computer virus or keyboard "sniffer" from recording the PIN question answers for later use by an intruder. Since the accessed data bases contain only the key generated by the answers and not the answers a breach of security of a database does not compromise the system.

Since this authentication occurs using only the card and the reader, a significant level of security assurance (proof of original card) occurs even if verification databases are part of the system but are unavailable for some reason, and access may be granted on that basis. In the unlikely event that an original SS card writer is stolen, and its encryption key is discovered, and it is then used to forge a copy of a badge with its own, now internally consistent signature, the signature of the original card stored in a database at the time it was originally written, can be available for cross-checking. This adds an additional level of security that would require not only the theft of an SS reader and its multiple keys, but the coincidence of database unavailability, to be defeated.

An alternative implementation reads the magnetic signature of the magnetic media and stores the signature along with other encryption data in a remote database. The database can be queried for the signature data when required. This system has a drawback in that it requires having access to the remote database for authentication. The benefit with this method is that a card signature can be created remotely without the requirement of magnetic stripe encoding. This system could generate a signature the first time a credit card or other token is used and store that data using cards currently in distribution. This system would be used until the normal issuance of new secure cards will replace cards in use.

Smart Chip Technology

In the case of Smart Chip technology, U.S. Pat. No. 6,260,146 (as well as pending U.S. patent applications Ser. Nos. 09/901,846 and 09/901,920) provides for additional self-referencing between the magnetic stripe data (encompassing the security protections just described) and data stored and similarly encrypted on the chip. Although individual chip signatures are problematic and more difficult and costly to establish, the SS magnetic stripe technology can provide that safeguard at minimal cost and be cross-checked against data encrypted on the chip.

SUMMARY OF THE INVENTION

Therefore, the principal object of the present invention is to provide a new and improved secure token access distributed database and system for using same, more specifically, the present invention relates to a new and improved secure token access distributed database system to provide verification of someone's or something's identity quickly and securely, wherein such database and system is readily scalable from local to nationwide to worldwide use.

It is a further object of the present invention to provide means that specifically addresses the use of an authenticated User ID (established primarily through the means described above, but in fact any accepted authentication scheme can be employed) in combination with a number of SS enabled databases connected by any means (e.g., LAN, WAN, Internet, dedicated lines, etc.) to provide "value-added" data in "real-time" at the main point of security contact.

It is a further object of the present invention to provide a concept by which a number (potentially unlimited) of SS "enabled" databases containing various kinds of data potentially useful to a requesting entity, either connected by some network means, or exposed to the Internet through a secure SS connection. "SS enabled" means that the database is an SS database or it is accessible through an SS interface mapped appropriately to the legacy system. These databases are owned by various entities that have an interest in sharing, or simply providing information in some form. Each entity controls its own data and can choose what to share, and with who based on clearance level of the requester, application type and so on.

It is a further object of the present invention to allow an identity request which has been received to cause an SS database to decode the ID string and search its records for data meaningful to the request. In some cases, it may respond with data keyed directly to the ID. In other cases it may respond with data relevant to the requesting application type or key-words embedded in the string. It may respond with a combination of these data elements or not respond at all if no relevant data is found.

It is a further object of the present invention to provide that such requests may be progressive in nature. Data contained in a response from one database may cause the requesting application to send out a new, modified request for the ID based on that data. Data responses may also be indirect, based on any number of filtering criteria. For example, a responding entity may not wish to expose the exact information it contains, but may send a set of "derived" results based on that data, thus providing relevant security data without compromising its exclusive ownership of its data.

Finally, it is a further object of the present invention to provide continual update of the incident data continuing even after sufficient information has been received to make a security decision (e.g., grant entry). If subsequent data arrives that could affect that decision, it may provide authorities and security personnel with timely data and opportunity for effective action.

Moreover, said data transfer may also be bi-directional. As part of the security incident information exchange, data may not only be received by the requesting entity, but the provider database may also receive updated information. That reciprocal information may be data obtained from a different provider as a result of the current (or a previous) request, or be current notification data. For example: ID XYZ requested access to a given location or certain data, and that access was granted (or denied) at a particular time based on a described set of criteria (e.g., ID authentication, police warrant, etc.).

Briefly, the value-added data access that is the subject matter of the instant invention as described herein more specifically addresses the use of an authenticated User ID (established primarily through the means described above, but in fact any accepted authentication scheme can be employed) in combination with a number of SS enabled databases connected by any means (e.g., LAN, WAN, Internet, dedicated lines, etc.) to provide "value-added" data in "real-time" at the main point of security contact.

The concept proposes a number (potentially unlimited) of SS "enabled" databases containing various kinds of data potentially useful to a requesting entity, either connected by some network means, or exposed to the internet through a secure SS connection. "SS enabled" means that the database is an SS database or it is accessible through an SS interface mapped appropriately to the legacy system. These databases are owned by various entities that have an interest in sharing, or simply providing information in some form. Each entity controls its own data and can choose what to share, and with who based on clearance level of the requester, application type and so on.

Once an SS security application (software/firmware) has obtained an ID, usually by swiping an SS card (though, as mentioned, any other means, keypad/board entry for example, may be used) it produces a request data stream that is presented to the potential universe of SS enabled databases. In some cases this will be a direct request to one or more addresses on a network or to known IP addresses. In other cases, the request may be broadcast in a more general way to all SS enabled databases using any of the available protocols (UDDI for example), or through proprietary means. SS enabled databases (especially those exposed to the internet) may be primed to "listen" for requests of a particular type.

Once a request has been received, an SS database will decode the ID string and search its records for data meaningful to the request. In some cases it may respond with data keyed directly to the ID. In other cases it may respond with data relevant to the requesting application type or key-words embedded in the string. It may respond with a combination of these data elements or not respond at all if no relevant data is found.

Requests may be progressive in nature. Data contained in a response from one database may cause the requesting application to send out a new, modified request for the ID based on that data. Data responses may also be indirect, based on any number of filtering criteria. For example, a responding entity may not wish to expose the exact information it contains, but may send a set of "derived" results based on that data, thus providing relevant security data without compromising its exclusive ownership of its data.

Also, continual update of the incident data may continue even after sufficient information has been received to make a security decision (e.g., grant entry). If subsequent data arrives that could affect that decision, it may provide authorities and security personnel with timely data and opportunity for effective action.

Data transfer may also be bi-directional. As part of the security incident information exchange, data may not only be received by the requesting entity, but the provider database may also receive updated information. That reciprocal information may be data obtained from a different provider as a result of the current (or a previous) request, or be current notification data. For example: ID XYZ requested access to a given location or certain data, and that access was granted (or denied) at a particular time based on a described set of criteria (e.g., ID authentication, police warrant, etc.).

Over time, a requesting application may build up a significant database of its own regarding the IDs it most often encounters, reducing its response time for those IDs and increasing the data (and hence security confidence) for that ID, while retaining the flexibility to process new IDs. Part of the system will include modules that conduct background operations to query known databases and search out new ones, for IDs or data profiles it maintains.

It is also possible, that the SS reader will be bundled with additional sensors for obtaining biometric data (e.g., fingerprints, retinal scan, blood type, face recognition, DNA markers, etc.) that can be compared to previously measured and encoded data.

BRIEF DESCRIPTION OF THE DRAWINGS

The above mentioned and other objects and features of this invention and the manner of attaining them will become apparent, and the invention itself will be best understood, by reference to the following description of the embodiments of the invention in conjunction with the accompanying drawings, wherein.

DESCRIPTION OF THE PREFERRED EMBODIMENTS

Figure 1:
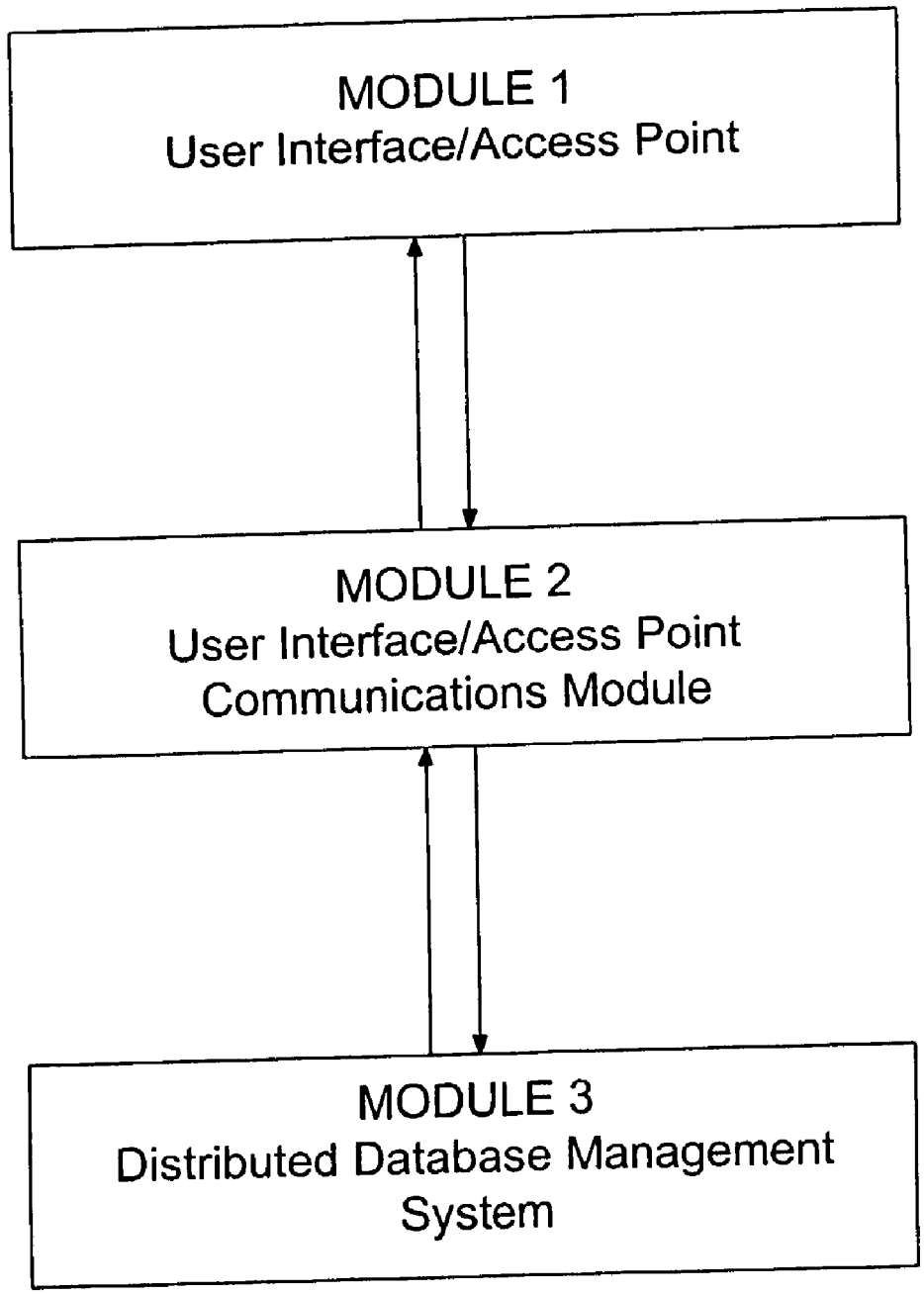
FIG. 1 is an organizational flow diagram illustrating an overview of the information flow of the secure token access distributed database (STADDS) system, constructed in accordance with the present invention.

Referring to FIG. 1, there is shown a conceptual schematic of the STADDS network and data flow. This illustrates an overview of the information flow within the STADDS system with respect to the three basic network system operations, designated for clarity as Modules 1, 2 and 3. Module 1 represents the user interface/access point components configuration. Module 2 represents the user interface/access point communications components configuration. Module 3 represents the distributed database organization and the ID data management server configuration as it relates to a global computer network, such as the Internet.

Figure 2:
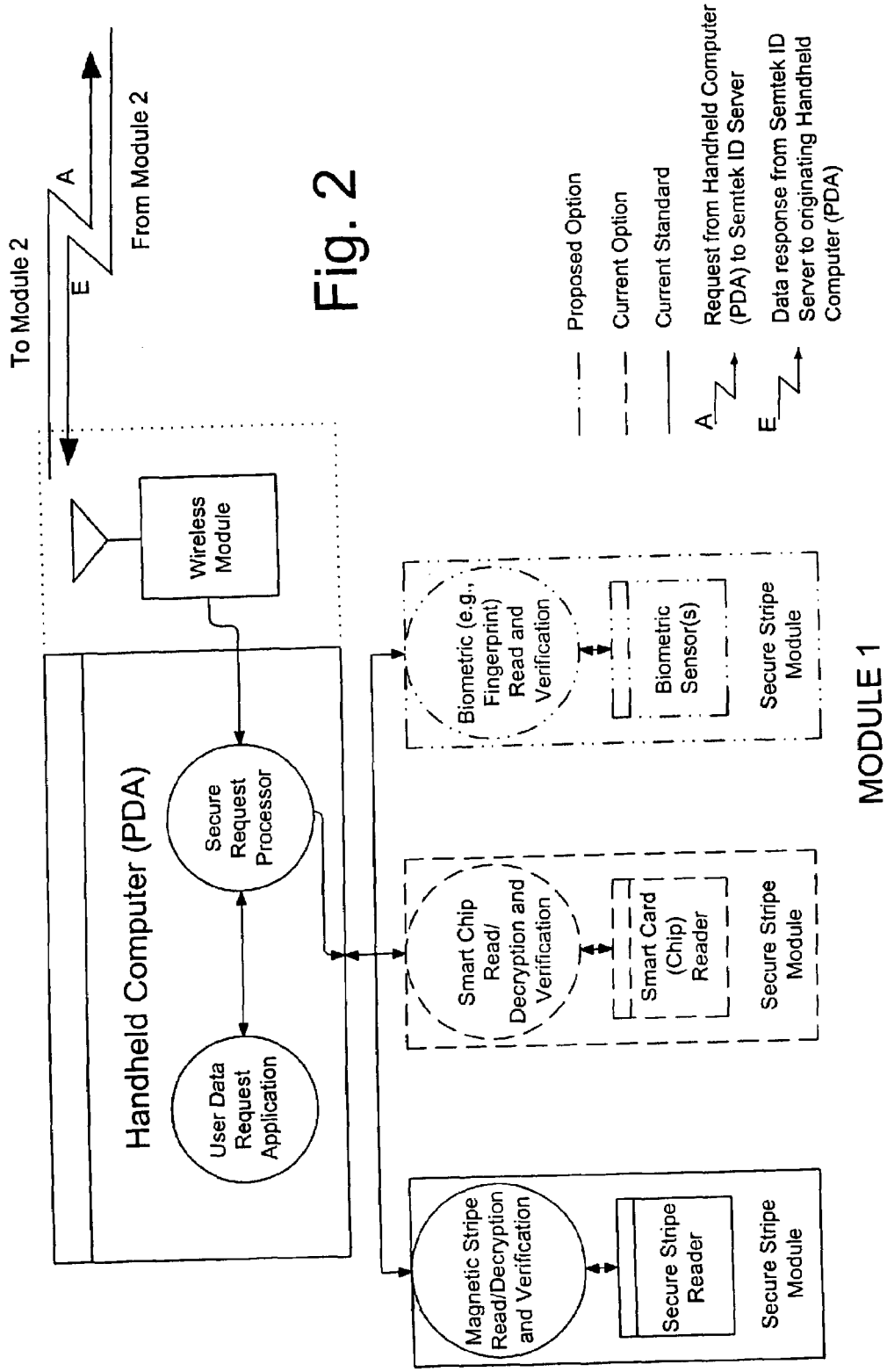
FIG. 2 is a diagrammatic flow chart illustrating the flow of information within the user interface/access point module (Module 1) component of the STADDS system, for use with a mobile or handheld computer (PDA), constructed in accordance with the present invention.

Referring to FIG. 2, there is shown a flow chart of the information flow within the STADDS user interface/access point module configuration, designated Module 1 for purposes of clarity, as well as the relationship between the components therein. Magnetic strip, smart chip and biometric sensors and readers, employing Secure Stripe™ (SS) technology, interface with a handheld computer, such as a conventional personal digital assistant (PDA). The handheld computer (PDA) then communicates with Module 2 via a wireless link.

Figure 3:
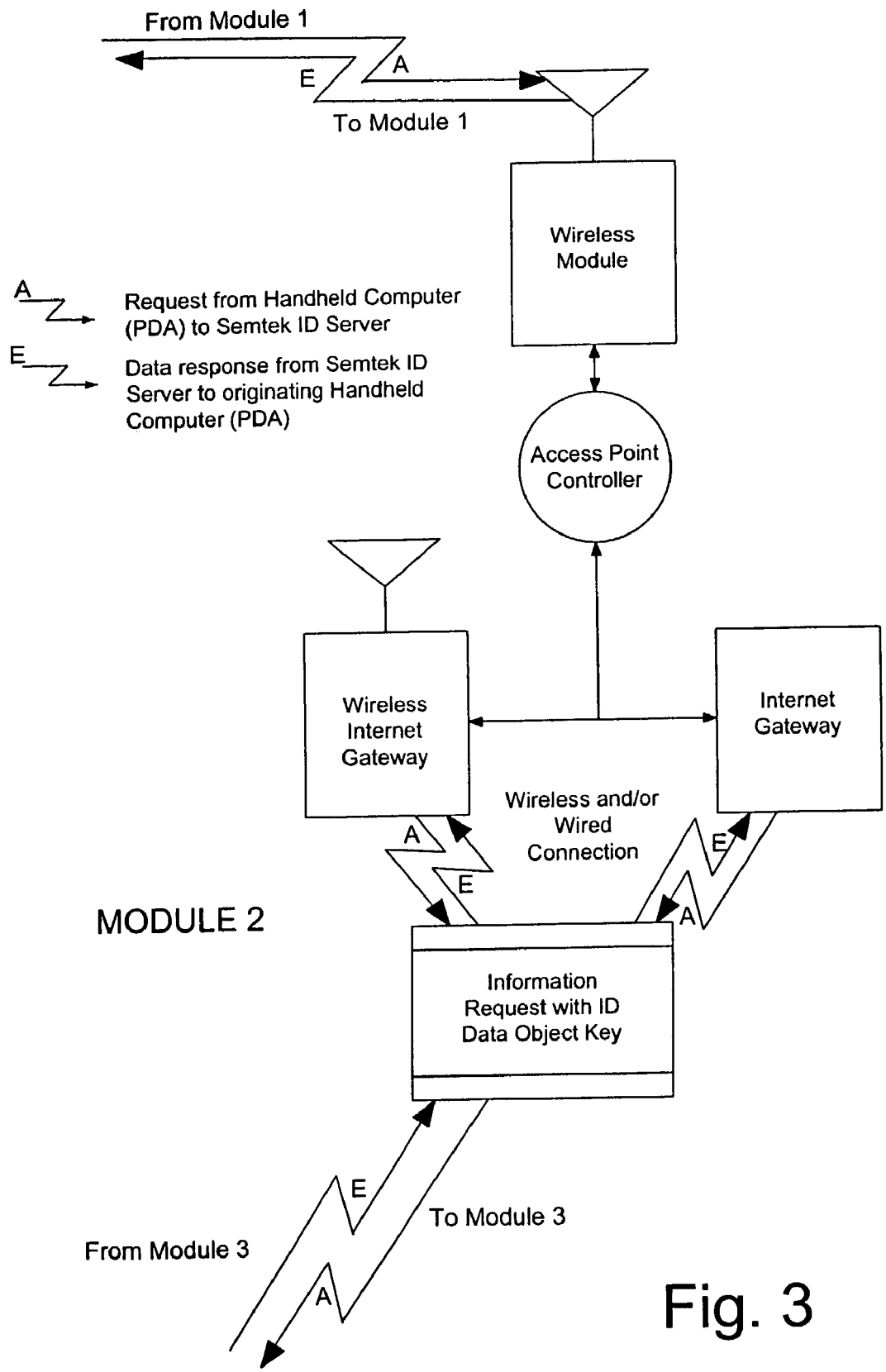
FIG. 3 is a diagrammatic flow chart illustrating the flow of information within the user interface/access point communication module (Module 2) component of the STADDS system, for use with a mobile or handheld computer (PDA), constructed in accordance with the present invention.

Referring to FIG. 3, there is shown a flow chart of the information flow within the STADDS user interface/access point communications module configuration, designated Module 2 for purposes of clarity, as well as the relationship between the components therein. Employing an access point controller, information requests with ID data object keys are routed to a global computer network, such as the Internet. The handheld computer (PDA) then communicates indirectly with Module 3 (described in detail below) via a hard wired or wireless link as provided in Module 2.

Figure 4:
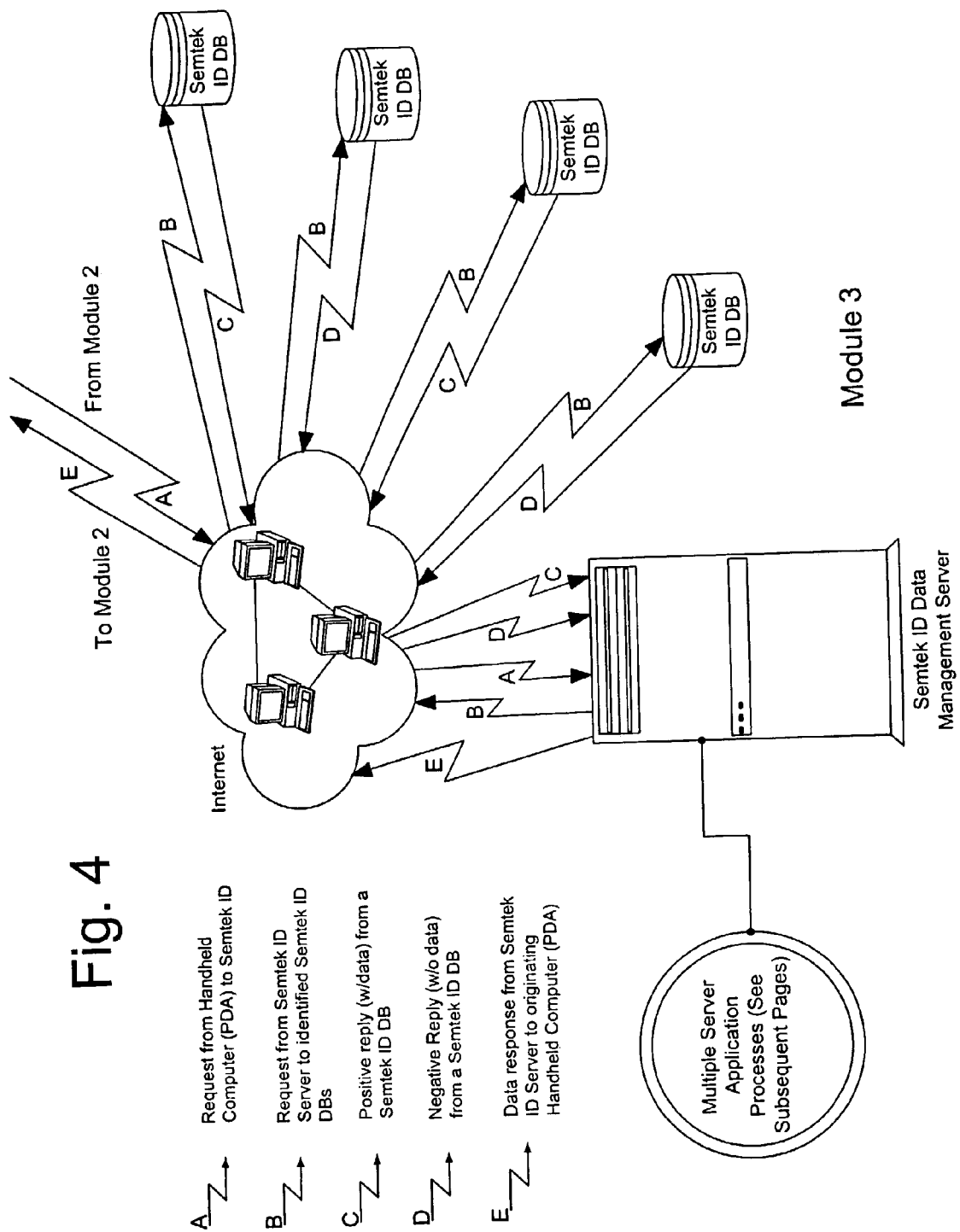
FIG. 4 is a diagrammatic flow chart illustrating the flow of information within the distributed database management module (Module 3) component of the STADDS system, for use with a mobile or handheld computer (PDA), constructed in accordance with the present invention.

Referring to FIG. 4, there is shown a flow chart of the information flow within the STADDS distributed database module configuration, designated Module 3 for purposes of clarity, as well as the relationship between the components therein. Information requests and data reports are routed from Module 2 to and from a global computer network facilitated by an ID data management server (IDDMS). The IDDMS manages this data acquisition from various ID databases as well as performs other multiple server application processes which are described in FIGS. 11 and 12 below.

In operation, the diagrams of FIGS. 2,3 and 4 present a conceptual schematic of the STADDS network and data flow.

Data flow begins with an ID token submission to a Secure Stripe™ (SS) access point represented here by a handheld computer (PDA).

The ID token is typically a card with a magnetic data stripe, smart chip, or both, containing encrypted identity information pertaining to the token, the token carrier (e.g., employee) or both. It may also contain data pertaining to specific applications or scenarios requiring secure access.

The SS access point contains a data reader enabled for magnetic stripe, smart chip technology, or both. It may also be enabled with sensors for recording biometric data from the token carrier (e.g., fingerprints, retinal scans, etc.) and/or various input mechanisms (e.g., key pad, stylus) for collecting additional information (e.g., PIN, password, signature, etc.). It may contain a write module for modifying magnetic data on the token before the complete transaction is finalized.

Resident application and processor software interacts with the hardware capability to acquire and process data. Significant, often sufficient, ID verification can be accomplished at the access point using SS technology and the data obtained from the token and token carrier.

If further authentication is required and/or an appropriate application data request is made by the user, a STADDS data request is constructed for transmission (In this example transmission is wireless, but other transmission methods apply.) Pathway (A) illustrates the flow of the data request from the access point (PDA) through an Internet gateway to a Semtek ID Data Management Server (IDDMS) via the Internet. Note that, although this example uses the internet extensively as an extended network, the concept applies for individual, as well as linked, networks such as WANs and LANs, even if they are not exposed to the internet. The IDDMS may be a single machine or a secure network of multiple, dedicated servers.

The IDDMS analyzes the request and the data it contains, matching it to any relevant data on the IDDMS. Depending on this analysis and the nature of the request, the IDDMS formulates a response (E) or additional requests (B). In the latter case, IDDMS requests are routed, via the Internet, to STADDS enabled databases exposed to the Internet. The IDDMS may direct the requests to specific databases, categories of databases or broadcast to all STADDS enabled databases. It employs conventional routing schemes for transmitting its requests.

A STADDS enabled database receiving an IDDMS request may send a positive response (C) containing pertinent data, give a negative response (D) indicating no relevant data, or ignore it. Positive responses are analyzed by the IDDMS and packaged into a response (E) which is transmitted to the original requesting access point.

Customizable parameters allow an IDDMS to collect responses (C) from multiple STADDS enabled databases before constructing a given access point response (E), break up data from a single STADDS response (C) into multiple access point responses (E), or send a single access point response (E) as a result of a single STADDS response (C). The IDDMS may "decide" not to send an access point response (E) if it determines that the data in a STADDS response (C) duplicates data already acquired or is irrelevant.

Finally, the access point software uses the data to take appropriate action. For example, it may grant access, provide information to the token carrier in response to a request, or provide data to the access point operator regarding the ID token, token carrier or the data request. If a writer is enabled, it may add or modify data on the token for later use.

Figure 5:
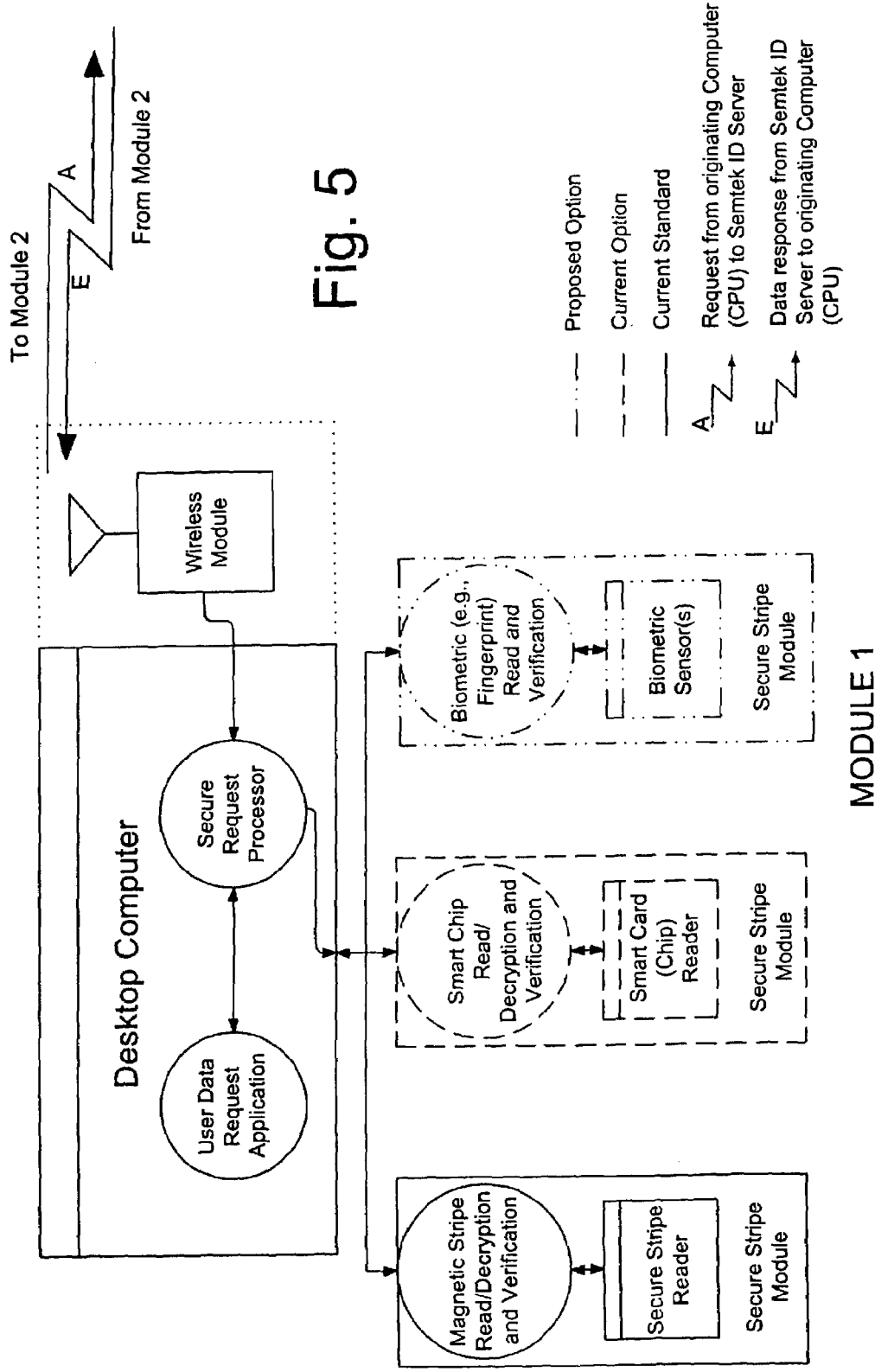
FIG. 5 is a diagrammatic flow chart illustrating the flow of information within the user interface/access point module (Module 1) component of the STADDS system, for use with a fixed location computer (CPU), constructed in accordance with the present invention.

Referring to FIG. 5, there is shown a flow chart of the information flow within the STADDS user interface/access point module configuration, designated Module 1 for purposes of clarity, as well as the relationship between the components therein. Magnetic strip, smart chip and biometric sensors and readers, employing Secure Stripe™ (SS) technology, interface with a fixed central processing unit (CPU), such as a conventional desktop computer (CPU). The fixed central processing unit (CPU) then communicates with Module 2 via a wireless link.

Figure 6:
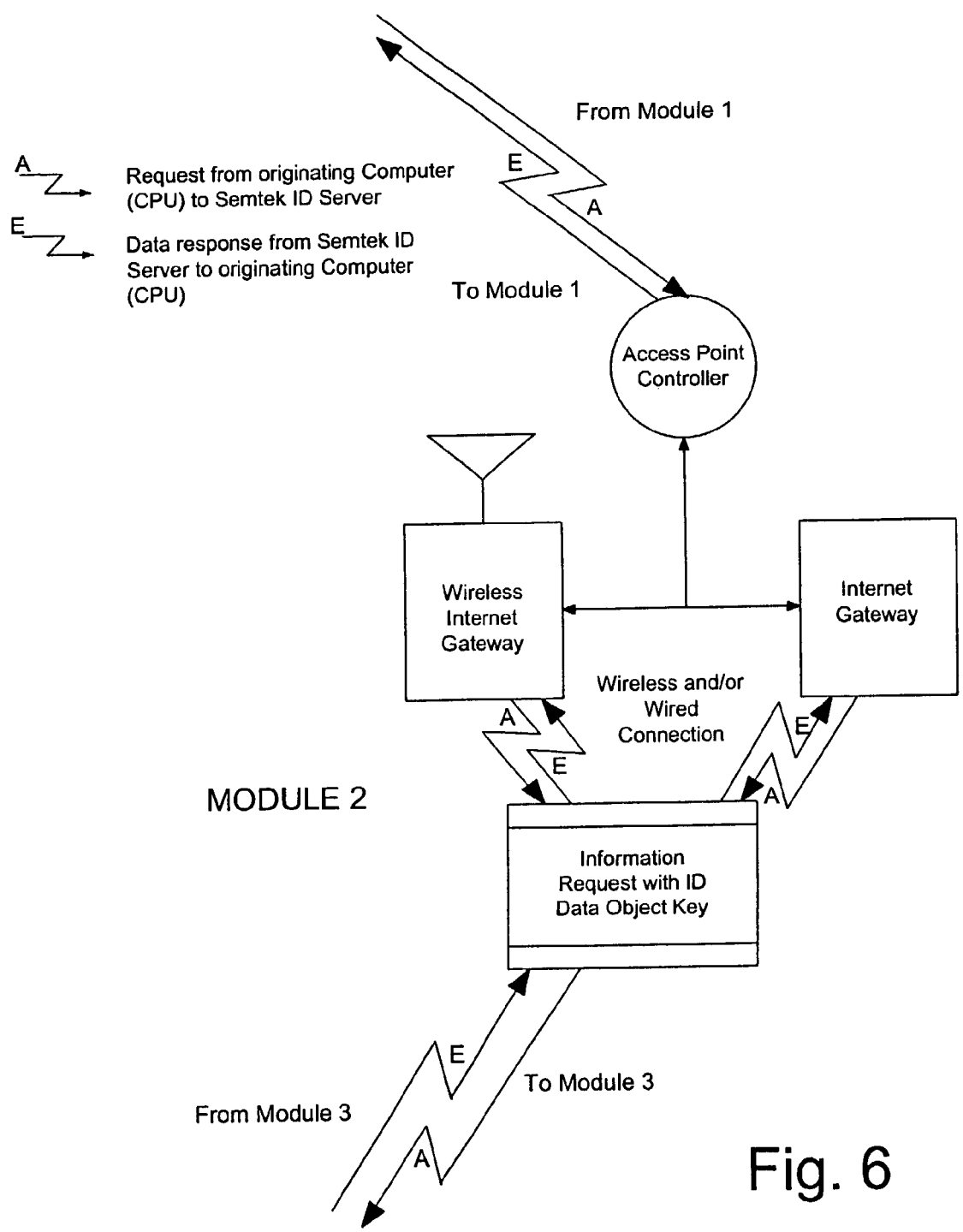
FIG. 6 is a diagrammatic flow chart illustrating the flow of information within the user interface/access point communication module (Module 2) component of the STADDS system, for use with a fixed location computer (CPU), constructed in accordance with the present invention.

Referring to FIG. 6, there is shown a flow chart of the information flow within the STADDS user interface/access point communications module configuration, designated Module 2 for purposes of clarity, as well as the relationship between the components therein. Employing an access point controller, information requests with ID data object keys are routed to a global computer network, such as the Internet. The fixed CPU, such as a conventional desktop computer, then communicates indirectly with Module 3 (described in detail below) via a hard wired or wireless link as provided in Module 2.

Figure 7:
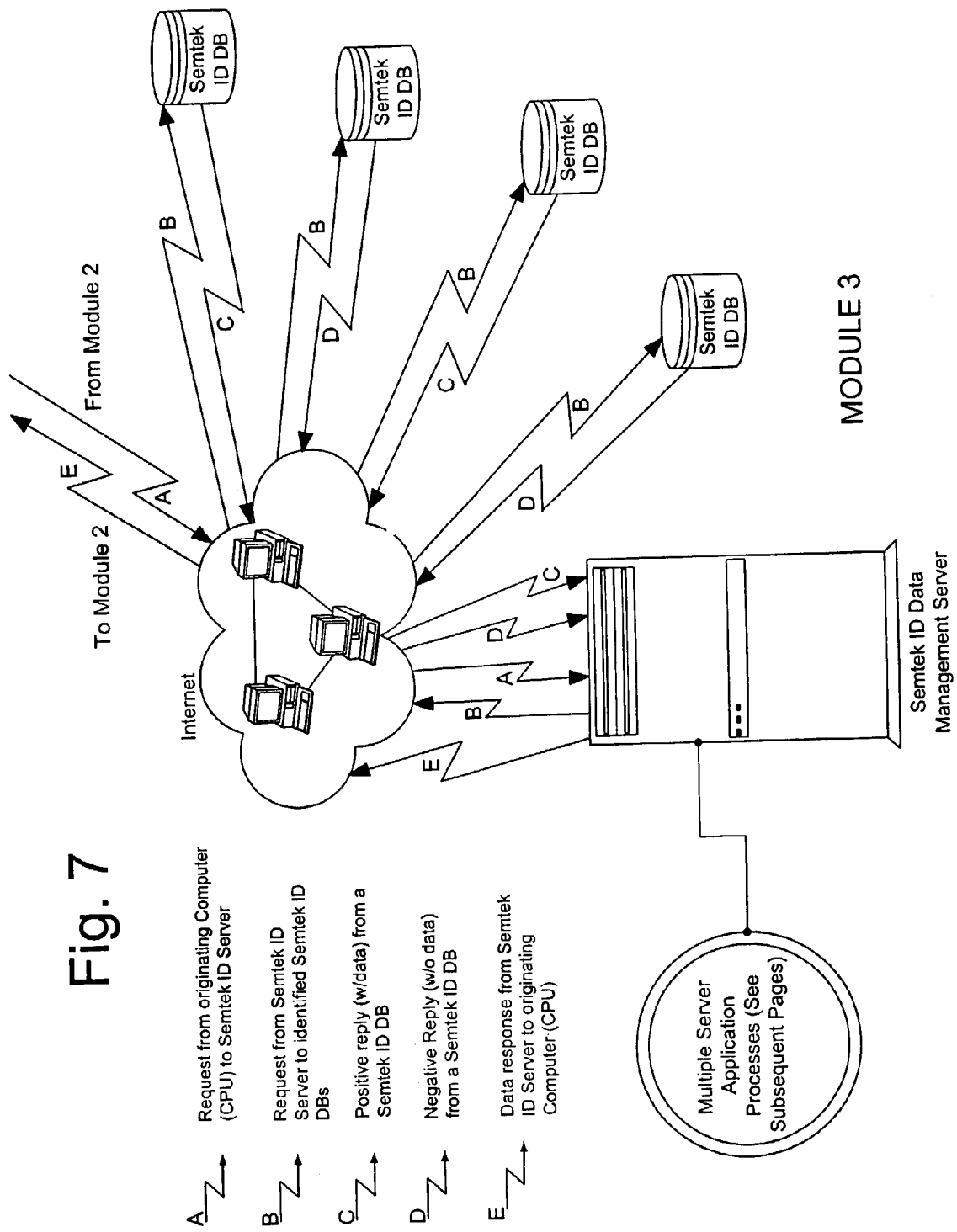
FIG. 7 is a diagrammatic flow chart illustrating the flow of information within the distributed database management module (Module 3) component of the STADDS system, for use with a fixed location computer (CPU), constructed in accordance with the present invention.

Referring to FIG. 7, there is shown a flow chart of the information flow within the STADDS distributed database module configuration, designated Module 3 for purposes of clarity, as well as the relationship between the components therein. Information requests and data reports are routed from Module 2 to and from a global computer network facilitated by an ID data management server (IDDMS). The IDDMS manages this data acquisition from various ID databases as well as performs other multiple server application processes which are described in FIGS. 11 and 12 below.

In operation, the diagrams of FIGS. 5, 6 and 7 present a conceptual schematic of the STADDS network and data flow. Data flow begins with an ID token submission to a Secure Stripe™ (SS) access point represented here by a Desktop Computer (PC).

The ID token is typically a card with a magnetic data stripe, smart chip, or both, containing encrypted identity information pertaining to the token, the token carrier (e.g., employee) or both. It may also contain data pertaining to specific applications or scenarios requiring secure access.

The SS access point contains a data reader enabled for magnetic stripe, smart chip technology, or both. It may also be enabled with sensors for recording biometric data from the token carrier (e.g., fingerprints, etc.) and/or various input mechanisms (e.g., key pad, stylus) for collecting additional information (e.g., PIN, password, signature, etc.). It may contain a write module for modifying magnetic data on the token before the complete transaction is finalized.

Resident application and processor software interacts with the hardware capability to acquire and process data. Significant, often sufficient, ID verification can be accomplished at the access point using SS technology and the data obtained from the token and token carrier.

If further authentication is required and/or an appropriate application data request is made by the user, a STADDS data request is constructed for transmission. In this example transmission is direct, but other transmission methods may apply. Pathway (A) illustrates the flow of the data request from the access point (PC) through an Internet gateway to a Semtek ID Data Management Server (IDDMS) via the Internet. Note that, although this example uses the internet extensively as an extended network, the concept applies for individual, as well as linked, networks such as WANs and LANs, even if they are not exposed to the internet. The IDDMS may be a single machine or a secure network of multiple, dedicated servers.

The IDDMS analyzes the request and the data it contains, matching it to any relevant data on the IDDMS. Depending on this analysis and the nature of the request, the IDDMS formulates a response (E) or additional requests (B). In the latter case, IDDMS requests are routed, via the Internet, to STADDS enabled databases exposed to the internet. The IDDMS may direct the requests to specific databases, categories of databases or broadcast to all STADDS enabled databases. It employs conventional routing schemes for transmitting its requests.

A STADDS enabled database receiving an IDDMS request may send a positive response (C) containing pertinent data, give a negative response (D) indicating no relevant data, or ignore it. Positive responses are analyzed by the IDDMS and packaged into a response (E) which is transmitted to the original requesting access point.

Customizable parameters allow an IDDMS to collect responses (C) from multiple STADDS enabled databases before constructing a given access point response (E), break up data from a single STADDS response (C) into multiple access point responses (E), or send a single access point response (E) as a result of a single STADDS response (C). The IDDMS may "decide" not to send an access point response (E) if it determines that the data in a STADDS response (C) duplicates data already acquired or is irrelevant.

Finally, the access point software uses the data to take appropriate action. For example, it may grant access, provide information to the token carrier in response to a request, or provide data to the access point operator regarding the ID token, token carrier or the data request. If a writer is enabled, it may add or modify data on the token for later use.

Figure 8:
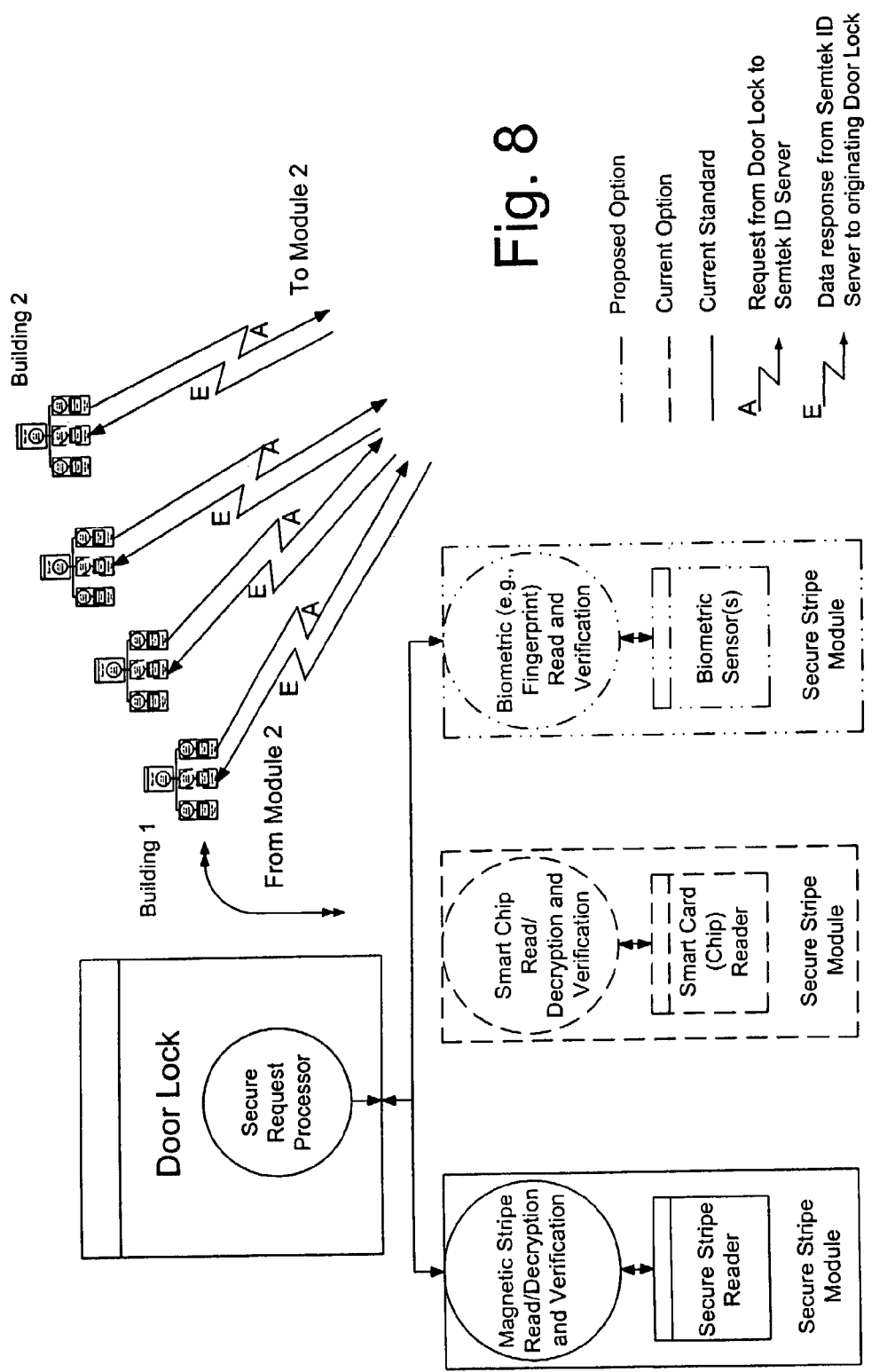
FIG. 8 is a diagrammatic flow chart illustrating the flow of information within the user interface/access point module (Module 1) component of the STADDS system, for use with a door lock or other secure access/entry point, constructed in accordance with the present invention.

Referring to FIG. 8, there is shown a flow chart of the information flow within the STADDS user interface/access point module configuration, designated Module 1 for purposes of clarity, as well as the relationship between the components therein. Magnetic strip, smart chip and biometric sensors and readers, employing Secure Stripe™ (SS) technology, interface with a secure access or entry point device, such as a door lock. The secure access or entry point device (the example used here is an electronic door lock mechanism) then communicates with Module 2 via a hard-wired or wireless link.

Figure 9:
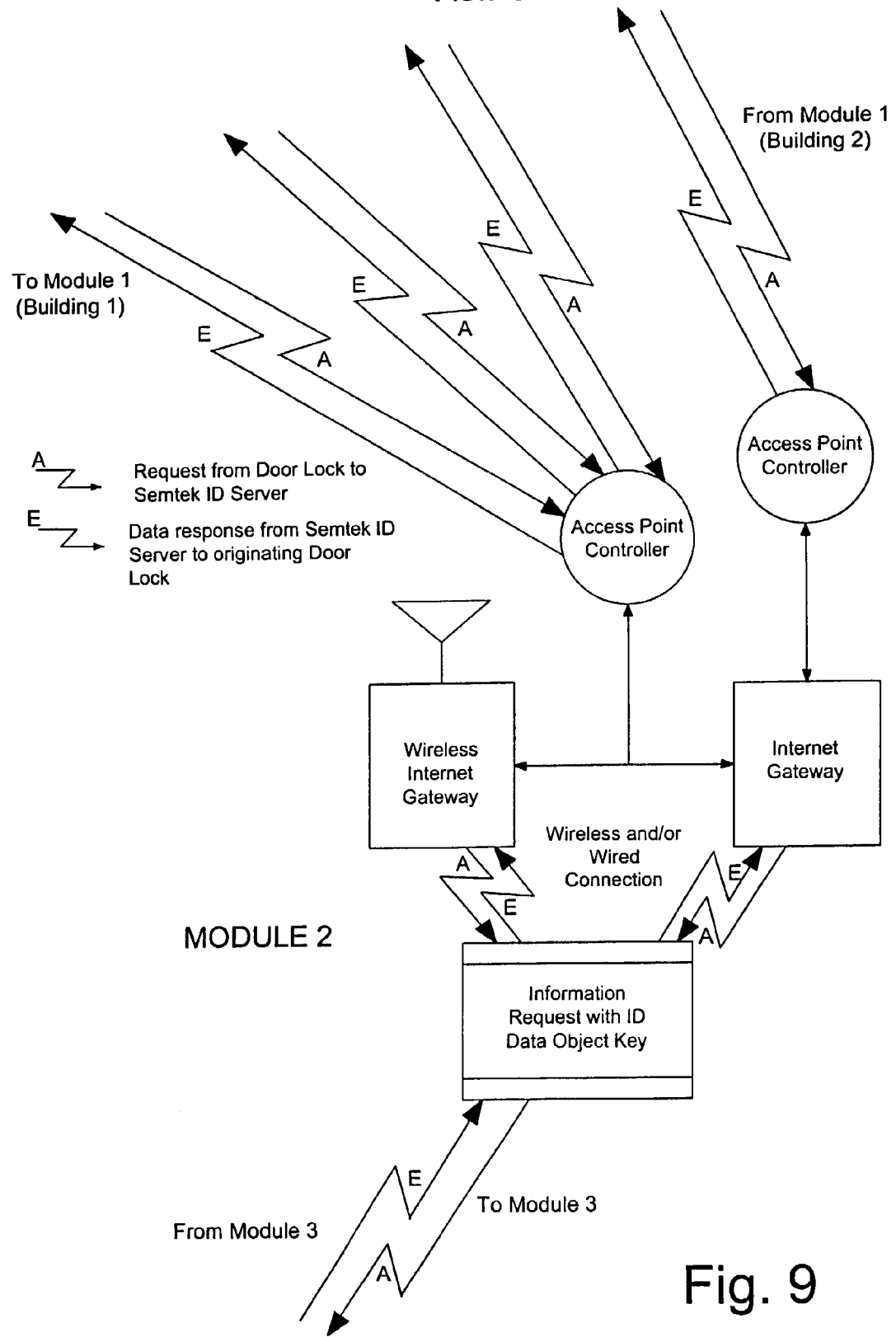
FIG. 9 is a diagrammatic flow chart illustrating the flow of information within the user interface/access point communication module (Module 2) component of the STADDS system, for use with a door lock or other secure access/entry point, constructed in accordance with the present invention.

Referring to FIG. 9, there is shown a flow chart of the information flow within the STADDS user interface/access point communications module configuration, designated Module 2 for purposes of clarity, as well as the relationship between the components therein. Employing one or more access point controllers (two are shown here for two separate buildings, building 1, with three door locks controlled, and building 2, having one door lock controlled), information requests with ID data object keys are routed to a global computer network, such as the Internet. The secure access or entry point device, such as an SS enabled door lock, then communicates indirectly with Module 3 (described in detail below) via a hard wired or wireless link as provided in Module 2.

Figure 10:
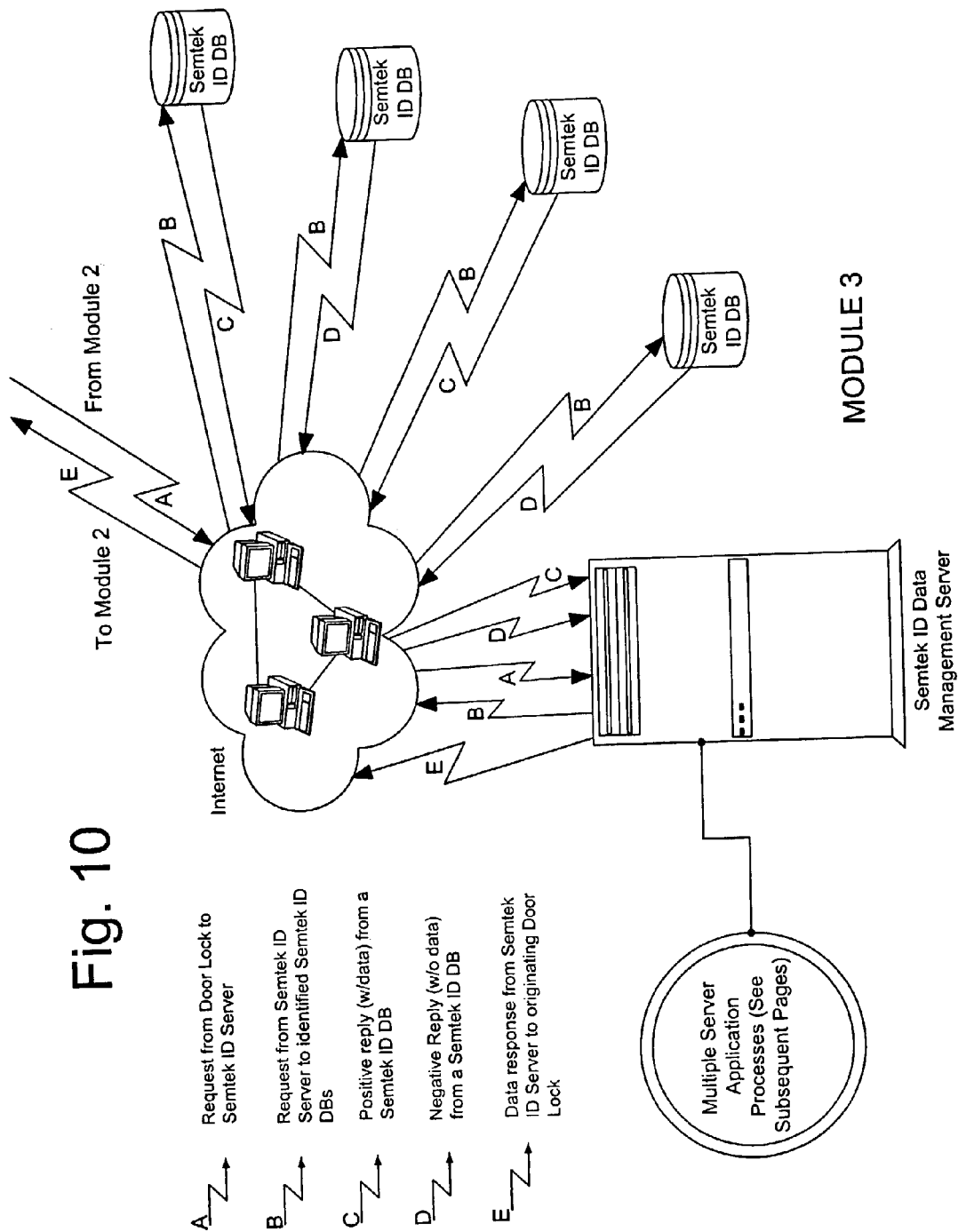
FIG. 10 is a diagrammatic flow chart illustrating the flow of information within the distributed database management module (Module 3) component of the STADDS system, for use with a door lock or other secure access/entry point, constructed in accordance with the present invention.
Figure 10:
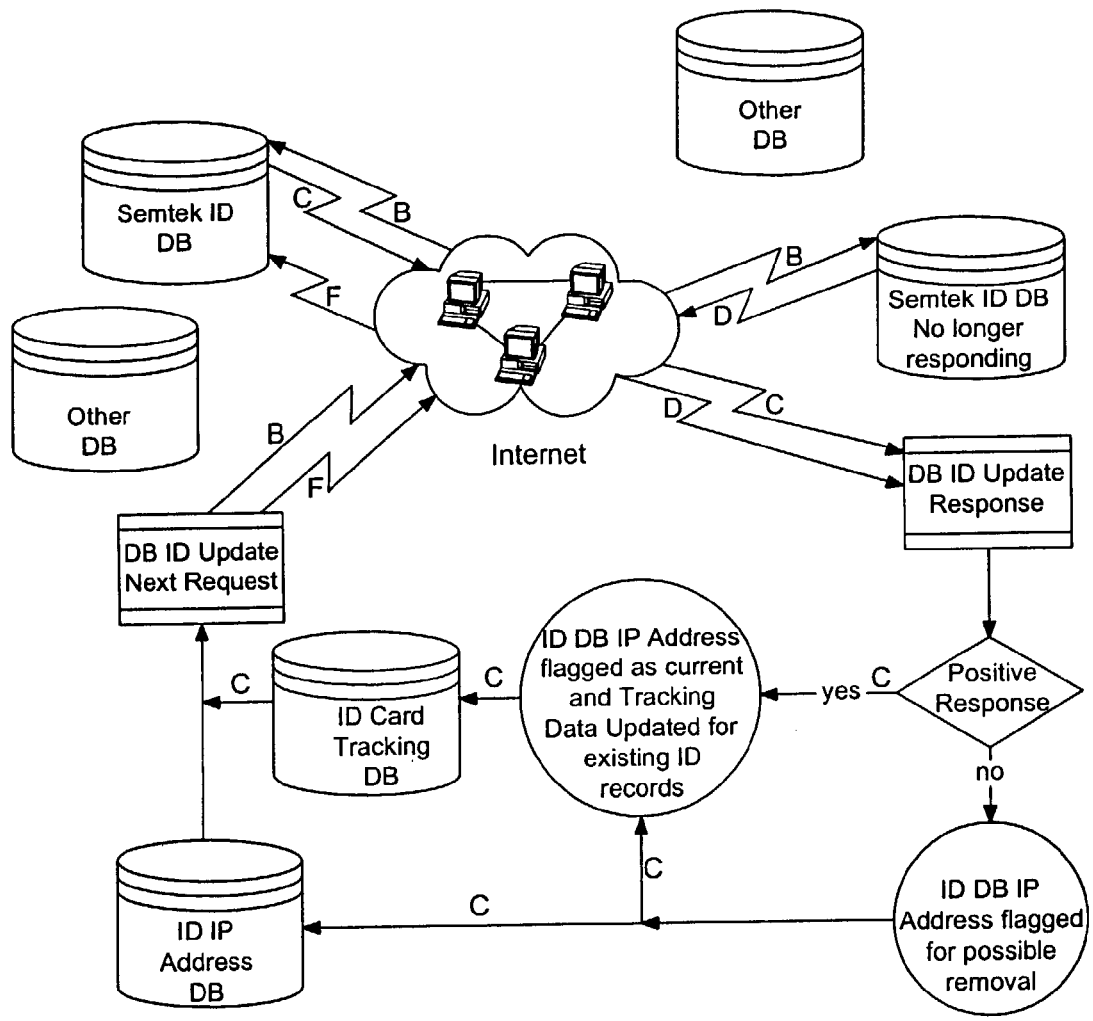

Referring to FIG. 10, there is shown a flow chart of the information flow within the STADDS distributed database module configuration, designated Module 3 for purposes of clarity, as well as the relationship between the components therein. Information requests and data reports are routed from Module 2 to and from a global computer network facilitated by an ID data management server (IDDMS). The IDDMS manages this data acquisition from various ID databases as well as performs other multiple server application processes which are described in FIGS. 11 and 12 below.

In operation, the diagrams of FIGS. 8, 9 and 10 present a conceptual schematic of the STADDS network and data flow. Data flow begins with an ID token submission to a Secure Stripe™ (SS) access point represented here by any of several door locks located in one or more buildings.

The ID token is typically a badge with a magnetic data stripe, smart chip, or both, containing encrypted identity information pertaining to the token, the token carrier (e.g., employee) or both. It may also contain data pertaining to specific applications or scenarios requiring secure access.

The SS access point contains a data reader enabled for magnetic stripe, smart chip technology, or both. It may also be enabled with sensors for recording biometric data from the token carrier (e.g., fingerprints) and/or various input mechanisms (e.g., key pad, stylus) for collecting additional information (e.g., PIN, password, signature). It may contain a write module for modifying magnetic data on the token before the complete transaction is finalized.

Resident application and processor software interacts with the hardware capability to acquire and process data. Significant, often sufficient, ID verification can be accomplished at the access point using SS technology and the data obtained from the token and token carrier.

If further authentication is required and/or an appropriate application data request is made by the user, a STADDS data request is constructed for transmission (In this example transmission is direct, but other transmission methods apply.) Pathway (A) illustrates the flow of the data request from the access point (PC) through an Internet gateway to a Semtek ID Data Management Server (IDDMS) via the Internet. Note that, although this example uses the internet extensively as an extended network, the concept applies for individual, as well as linked, networks such as WANs and LANs, even if they are not exposed to the internet. The IDDMS may be a single machine or a secure network of multiple, dedicated servers.

The IDDMS analyzes the request and the data it contains, matching it to any relevant data on the IDDMS. Depending on this analysis and the nature of the request, the IDDMS formulates a response (E) or additional requests (B). In the latter case, IDDMS requests are routed, via the Internet, to STADDS enabled databases exposed to the internet. The IDDMS may direct the requests to specific databases, categories of databases or broadcast to all STADDS enabled databases. It employs conventional routing schemes for transmitting its requests.

A STADDS enabled database receiving an IDDMS request may send a positive response (C) containing pertinent data, give a negative response (D) indicating no relevant data, or ignore it. Positive responses are analyzed by the IDDMS and packaged into a response (E) which is transmitted to the original requesting access point.

Customizable parameters allow an IDDMS to collect responses (C) from multiple STADDS enabled databases before constructing a given access point response (E), break up data from a single STADDS response (C) into multiple access point responses (E), or send a single access point response (E) as a result of a single STADDS response (C). The IDDMS may "decide" not to send an access point response (E) if it determines that the data in a STADDS response (C) duplicates data already acquired or is irrelevant.

Finally, the access point software uses the data to take appropriate action. For example, it may grant access, provide information to the token carrier in response to a request, or provide data to the access point operator regarding the ID token, token carrier or the data request. If a writer is enabled, it may add or modify data on the token for later use.

Figure 11:
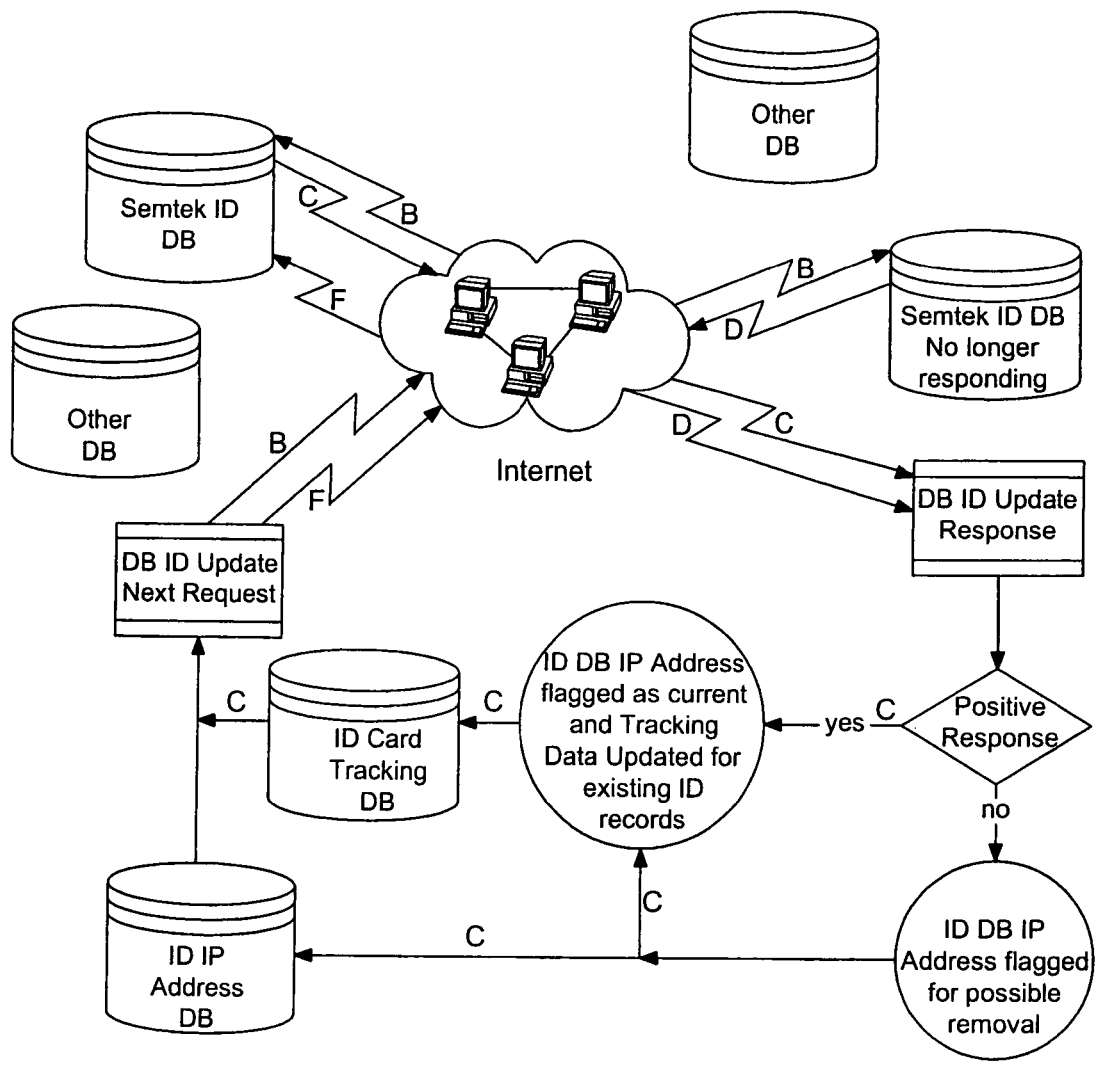
FIG. 11 is a diagrammatic flow chart illustrating the flow of information within the ID database update process, a background process of the STADDS system, constructed in accordance with the present invention.

Referring to FIG. 11, there is shown an ID database update process flow chart of the secure token access distributed database system (STADDS) and its secure card ID process. This ID database update process functions and runs continuously as a background process.

In operation FIG. 11 presents a conceptual schematic of the update process STADDS might use to synchronize ID data throughout the system. The update process is usually run as a background process during non-peak usage time. Data flow begins with an update request (B), via the Internet, or through network protocols if the system is an isolated network (e.g., WAN or LAN), from a Semtek ID Data Management Server (IDDMS). The request is made to the first STADDS enabled database on the active list of the IDDMS address database (IP or network IDs depending on the nature of the network). Each subsequent data flow during the update process, utilizes the next address in the active list until all active addresses have been attempted. Parameters may be set to execute requests against inactive or suspended addresses (e.g., last known) in an attempt to reestablish previously lost contact.

The update request may include encrypted recognition protocols from the IDDMS along with requests for authentication and a list of ID profiles or topics representing currently active records being tracked by the system. It may also request a list of records a responding STADDS database may wish updated.

A STADDS enabled database receiving an IDDMS update request (B) may send a positive response (C) containing recognition protocols and data relevant to the request or give a negative response (here shown as a "no") containing only recognition protocols and indicating no relevant or new data.

Positive responses are analyzed by the IDDMS to correlate data and establish appropriate updates. This data is packaged into update responses (F) which are transmitted to the distributed STADDS databases that requested updates in their responses (C) to the original IDDMS request (B). All data in a given STADDS database is "owned" by that individual database. Data exchange during the update process is controlled by strictly enforced ownership rules both at the origination point of each datum and at the IDDMS.

Both positive and negative responses are used to flag IP and/or network addresses as current. Non responses are flagged as potentially no longer active or inaccessible and tracked for reporting and possible intervention.

Note that the data exchange described here is an example and can be customized to suit specific system or application needs.

Figure 12:
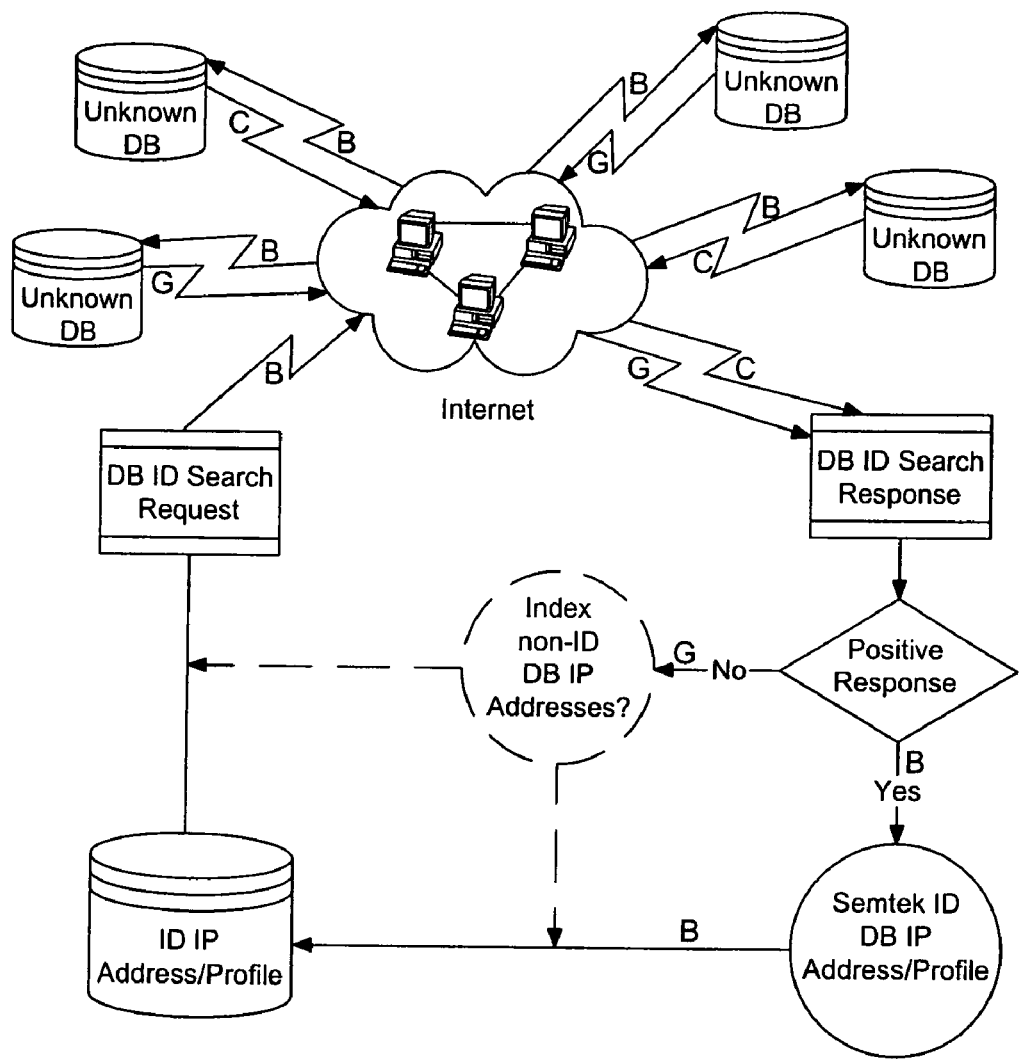
FIG. 12 is a diagrammatic flow chart illustrating the flow of information within the ID database locator application process, a background process of the STADDS system, constructed in accordance with the present invention.

Referring to FIG. 12, there is shown an ID database locator application flow chart of the secure token access distributed database system (STADDS) and its secure card ID process. This ID database update process functions and runs continuously as a background process.

In operation, FIG. 12 illustrates the background process of ID database locator which runs continuously to locate and assimilate the data from newly found databases. It is expected that many entities will purchase or retrofit databases for compatibility to STAADS. Semtek may not always be aware of the accessibility of these databases or that accessibility may change over time. For this reason, Semtek ID Data Management Servers (IDDMS) will use a variety of schemes to comb the Internet for potential participation partners in the STADDS network. This diagram presents a conceptual schematic of the locator process STADDS might use to locate STADDS enabled databases extant on the Internet. The ID Database Locator process is usually run as a background process.

Data flow begins with an ID search request (B) from an IDDMS, broadcast via the Internet, or through network protocols if the system is an isolated network (e.g., WAN or LAN). The request is made using established techniques for querying unknown IP addresses. Parameters may be set to execute requests against inactive or suspended addresses (e.g., last known) in an attempt to reestablish previously lost contact.

The search request (B) includes encrypted recognition protocols from the IDDMS along with requests for authentication and an IP address/profile of a responding STADDS enabled database. This profile will have a standard format that will allow STADDS to classify the new database and establish data exchange protocols. The data contained in the profile is owned by the responding STADDS database and is controlled by it and the IDDMS according to strictly enforced ownership rules.

Both positive (C) and negative responses (G) are used to flag IP and/or network addresses as current and as STAADS enabled or not. Non responses are flagged as potentially no longer active or inaccessible and tracked for reporting purposes.

Note that the data exchange described here is an example and can be customized to suit specific system or application needs.

CASE OPERATIONS EXAMPLES

Example Case 1

Inbound Cargo Control (Customs officer at the border; Security Guard at a secure loading/unloading yard; federal, state or local police patrol officers engaged in a traffic stop)

A Customs officer at the border may swipe a driver's license (with magnetic strip) through an SS reader for a truck driver transporting a restricted cargo into the country. The SS reader verifies the authenticity of the license, both by internal reference of the media signature and by accessing an SS enabled database maintained by the Customs Service that collects original magnetic signature data for licenses cleared for international transport of restricted cargos. In addition, a request by the Customs DMV software application is sent specifically to known SS enabled databases with potentially relevant data and generally to the "universe" of SS enabled databases.

The state (indicated on the driver's license) DMV SS database may send a picture of the driver to the customs officer's terminal for comparison. It may also have traffic violation data, but state law may restrict the availability of it. While a state traffic officer (federal, state or local police patrol officers) may be given immediate access to that data, the customs officer might receive a report derived from that information indicating a severity and caution level.

A response from the driver's employer SS database might include information regarding the nature of the shipment whether it was, in fact, picked up at the appropriate place, vehicle mileage at pickup and estimated mileage at the border inspection station, even at which inspection station he is expected to arrive. In turn, the time, location and mileage of the truck's crossing may be sent as an update to the employer database.

Another possibility is that a keyword concerning the cargo itself may illicit a response from an SS database maintained by the EPA (or by the Customs Service that continually updates its data profiles on potential issues such as restricted cargos) that the cargo in question contains substances that have just been further restricted by the ICC.

Finally, data might arrive after the truck was passed, that the driver is wanted for questioning regarding another incident. This information can be used to alert the proper authorities.

Example Case 2a

Access to a Restricted Building or Area

An employee working in a restricted location, swipes his SS badge through an SS reader. The reader verifies that the badge is original and the encoded data is also original. The software application controlling the SS reader makes a request to specific SS enabled databases for any updates regarding this ID or carrier. This information, if any, is retrieved immediately. If a human gatekeeper (guard) is involved, a comparison of the ID carrier, the picture on the badge and a freshly downloaded, current, picture of the original ID carrier might be made. This information may be sufficient to grant entry.

A general request may also go out to all (or some domain subset) of the SS databases on the network or (through a secure connection) the internet. If subsequent information is retrieved (after entry has been granted) the guard or some other entity may be notified for review. If the information is of a predefined nature, an alarm may also be triggered.

Example Case 2b

Card Signature Missing or Fails

In this scenario, an employee working in a restricted location, swipes his SS badge through an SS reader. The card and employee are, in fact valid, but the reader fails to verify the SS card signature, either because it is missing, is unreadable, or is wrong (magnetically altered in some way). The employee swipes his driver's license, also encoded with an SS signature which is verified through the DMV database, much as in Case 1. The software application controlling the SS reader makes a request to specific SS enabled databases for DMV comparison for this employee and gets verification. As with case 2a, if a human gatekeeper (guard) is involved, additional comparisons can be made. Either the guard, if there is one, or the security application deems that the alternate verification is sufficient to grant entry. In addition, the security database is notified that the employee's badge is defective and needs immediate replacement. All other conditions in Case 2a may apply.

Example Case 3a

Access of Restricted Information via a Secure Workstation

In this scenario, an SS reader is integrated with a secure work station. The work station, itself is connected to a secure database or network, but is isolated from the outside. As in Case 2, a requestor swipes his SS badge through the SS reader and the same badge authentication process occurs. The controlling security application may access SS enabled databases only on the secure network.

Example Case 3b

Access of Restricted Information via a Secure Workstation

In this scenario, an SS reader is integrated with a secure work station. The work station, itself is connected to a secure database or network, but is isolated from the outside, except for a secure (e.g., a virtual private network or VPN) connection utilized by the SS security application. As in Case 3, a requestor swipes his SS badge through the SS reader and the same badge authentication process occurs. However, as in cases 2a and 2b, there is a greater range of security options for verification or alert.

Example Case 3c

Access of Restricted Information via a Secure Workstation

In this scenario, an SS reader is integrated into a security work station (which may also be a PDA device) which is separate from the secure work station the ID carrier wishes to access. The secure work station, itself is connected to a secure database or network, but is isolated from the outside. In this case the security work station has all of the authentication options available in the previously described scenarios, but the security application provides access to the secure work station if the ID is passed. This access may come in several methods.

Some examples are: 1. A key code (perhaps time sensitive) is displayed that the ID carrier can enter at the secure terminal. 2. A hardwired connection to the secure terminal may provide the security application with the ability to unlock the secure work station. 3. The SS hardware integrated with the security work station (or PDA) might be a reader/writer. In this case, the SS hardware has the ability to add or change magnetic data in the ID card/badge. This new data might include a key code (perhaps time-stamped), for example. An SS reader integrated with the secure work station would then read that access code when the badge is swiped through it, and grant access (perhaps within a limited time window).

Example Case 4

Individual Purchasing Goods or Services

An individual with an SS reader integrated with their PC or wireless PDA can swipe a credit card when purchasing goods online, or at a kiosk in a commercial location. Depending on the SS application parameters, value-added information can be readily obtained to provide several benefits. For the merchant or credit issuer, it provides a higher level of authentication (immediate local and remote authentication as previously described) which should help to reduce credit card fraud. The kiosk may be of the video gaming type used in casinos or unattended vending machines used for small purchases.

The customer may get third party data on the product or merchant (or both), regarding reliability, support quality, price comparison, or comparable alternatives, for example.

Example Case 5

Individual Purchase by Providing a Credit Application and ID

An individual with an SS reader integrated with their PC or wireless PDA can swipe a credit card, driver's license, or other ID, when filling out a credit application online, or at a comparable station in a commercial location such as an automobile dealership or a real estate office. Depending on the SS application parameters, value-added information can be readily obtained to provide several benefits. First, most or all current, relevant data can be automatically entered into the application, a credit check inmmediately run, and so on.

For the merchant or lender it provides a higher level of authentication (as previously described) which should help to reduce fraud or future default. The customer may get third party data on the product, merchant or lender (or all three) regarding reliability, support quality or price comparison, terms definitions, or comparable alternatives, for example.

Example Case 6

Outside Sales

A sales representative (real estate, door-to-door cosmetics, for example) with an SS reader integrated with their wireless PDA can swipe a customer's credit card, driver's license, or other ID. In addition to the higher level of authentication previously described, value-added information can be readily obtained to provide several benefits.

For example: any previous purchases, requests or complaints, by the customer can be made immediately available to the sales representative. 2. Most or all current, relevant customer data can be automatically entered into a sales order. 3. The sales data and any comments by the customer or sales representative can be recorded for immediate or future update to the company's database.

Example Case 7

Immigration/passport Control at Entry Point to US (and Potentially Other Client Countries)

An individual entering the US swipes an ID card, driver's license, or the edge of a magnetically striped passport through an SS reader integrated with a security work station (or wireless PDA) at passport control or customs at the point of entry. The authentication options previously described are available to the federal official on site. This should streamline the operation while providing an added level of security. Interpol data and data from other participating countries are examples of the kinds of information that might be passed on. Security summaries of that data and relevant data from countries visited, such as disease alerts, are other contemplated possibilities.

Eventually, it is contemplated that it maybe possible to eliminate the need for physical passports, at least when traveling between participating countries. All relevant data can be stored electronically, including entry/exit information. Any of several ID mechanisms (e.g., national ID card, driver's license, even an SS credit card or smart card) can be used to establish identity and access that data. If a physical passport is needed (for travel to a non-participating country), it can be printed on the spot, with all relevant information current.

If the SS hardware includes a writer (magnetic stripe and/or smart chip), visa and other relevant data can be added to the ID card with a unique signature that is stored for reference, as previously described. This can be useful in any number of ways, INS checks, purchase of significant goods, and as an aid to potential employers, for example.

It should be understood, however, that even though these numerous characteristics and advantages of the invention have been set forth in the foregoing description, together with details of the structure and function of the invention, the disclosure is illustrative only, and changes may be made in detail, especially in matters of shape, size, interactivity and arrangement of components within the principal of the invention to the full extent indicated by the broad general meaning of the terms in which the appended claims are expressed.

What is claimed is:

1. An access control system, comprising:
    a local terminal disposed at an access point, comprising:
        a token reader configured to detect identification information from a token having identification information encoded therein, and
        a verification module configured to receive the identification information from the token reader and to verify authenticity of the token based on the identification information, and to generate a first request for first additional information relating to token; and
    a remote data management server in communicative contact with the local terminal, the data management server configured to receive the first request for the first additional information from the local terminal, to retrieve data relevant to the received first request and to return the retrieved data to the local terminal, wherein the data returned to the local terminal comprises information suitable for verifying at the local terminal the identity of a holder of the token, and wherein the verification module examines the first information and generates a second request for second additional information from the remote data management server, wherein the request for second additional information is open ended and based on data returned to the local terminal from the first request for additional information, and wherein the remote data management server queries a plurality of databases based on the request for second additional information.

2. The system of claim 1, wherein the verification of the authenticity of the token is performed locally by the verification module.

3. The system of claim 1, wherein the data relevant to the first or second received request comprises data pertaining to an authorized holder of the token.

4. The system of claim 1, wherein the data relevant to the first or second received request comprises data pertaining to a purpose for which access is being requested.

5. The system of claim 1, wherein the local terminal further comprises a user interface to provide the returned information to an operator, thereby allowing the operator to use the returned information to verify the identity of the holder of the token.

6. The system of claim 1, wherein the access point comprises a point of sale or point of entry.

7. The system of claim 1, further comprising a plurality of local terminals disposed at respective access points, each local terminal comprising a token reader and a verification module.

8. The system of claim 1, wherein the verification module comprises software configured to detect an electronic signature of the detected identification information and to determine authenticity of the token based on the electronic signature.

9. The system of claim 1, wherein the local terminal is implemented using a computing device.

10. The system of claim 1, wherein the local terminal and data management server are communicatively coupled using a wired or wireless communications interface.

11. The system of claim 1, wherein the token further comprises information pertaining to a designated carrier of the token.

12. The system of claim 1, wherein the local terminal further comprises a user interface configured to allow a user to enter additional authentication information.

13. The system of claim 12, wherein the additional authentication information comprises a PIN, a password, or a signature.

14. The system of claim 1, wherein the local terminal further comprises a write module configured to modify or append data to the information encoded in the token.

15. The system of claim 1, wherein the data management server comprises a plurality of databases.

16. The system of claim 1, wherein the token reader comprises a magnetic stripe card reader, a smart card reader, a bar code reader or a biometric sensor.

17. A method for determining whether to grant access to a token holder, comprising:
- detecting identification information from a token placed in proximity to a local terminal disposed at a point of access, the token having the identification information encoded therein;
- verifying at the local terminal the authenticity of the token based on the identification information;
- generating by the terminal a first request for additional information relating to the token; and
- receiving data relevant to the first request for additional information from a remote data management server, wherein the data relevant to the first request comprises information suitable for verifying the identity of a holder of the token, and wherein the terminal examines the first information and generates a second request for second additional information from the remote data management server, wherein the request for second additional information is open ended and based on data returned to the local terminal from the first request for additional information, and wherein the remote data management server queries a plurality of databases based on the request for second additional information.

18. The method of claim 17, wherein the step of verifying performs the verification locally at the local terminal.

19. The method of claim 17, wherein the step of verifying comprises a step of sending at least a portion of the identification information to a remote server for verification.

20. The method of claim 17, wherein the data relevant to the first or second request comprises data pertaining to the identity of an authorized holder of the token.

21. The method of claim 17, wherein the data relevant to the first or second request comprises data pertaining to a purpose for which access is being requested.

22. The method of claim 17, further comprising the step of providing the received data to an operator at the terminal, enabling the operator to determine the identity of an authorized holder of the token.

23. The method of claim 17, further comprising the step of providing the received data to an operator at the terminal, enabling the operator to determine authenticity of the holder of the token.

24. The method of claim 17, further comprising the step of determining an electronic signature of the detected identification information and determining authenticity of the token based on the electronic signature.

25. The method of claim 17, wherein the token further comprises information pertaining to a designated holder of the token.

26. The method of claim 17, further comprising a step of receiving additional authentication information from a holder of the token.

27. The method of claim 17, further comprising a step of modifying or appending data to the information encoded in the token.

28. The method of claim 17, wherein the second request for further information based on the data contained in the received information comprises a modified request.

29. A local terminal disposed at an access point, comprising:
- a read module configured to detect identification information from a token having the identification information encoded therein;
- a verification module configured to receive the identification information from the token reader and to verify authenticity of the token based on the identification information, and to generate a first request for first additional information from a remote data management server, the first additional information relating to the token, wherein the verification module generates a second request for second additional information from the remote data management server, wherein the request for second additional information is open ended and based on data returned to the local terminal from the first request for additional information; and
- a communications module configured to send the requests for additional information to the remote data management server, and to receive data relevant to the requests for additional information from the remote data management server, wherein the data relevant to the requests comprises information suitable for verifying the identity of a holder of the token, and wherein the remote data management server queries a plurality of databases based on the request for second additional information.

30. The system of claim 29, wherein the data relevant to the first or second received request comprises data pertaining to an authorized holder of the token.

31. The system of claim 29, wherein the verification of the token authenticity is performed locally by the verification module.

32. The system of claim 29, wherein the data relevant to the first or second received request comprises data pertaining to a purpose for which access is being requested.

33. The system of claim 29, wherein the verification module comprises software configured to detect an electronic signature of the detected identification information and to determine authenticity of the token based on the electronic signature.

34. The system of claim 29, wherein the token further comprises information pertaining to a designated holder of the token.

35. The system of claim 29, wherein the terminal further comprises a user interface configured to allow a user to enter additional authentication information.

36. The system of claim 35, wherein the additional authentication information comprises a PIN, a password, or a signature.

37. The system of claim 29, wherein the terminal further comprises a write module configured to modify or append data to the information encoded in the token.

38. The system of claim 29, wherein the token reader comprises a magnetic stripe card reader, a smart card reader, a bar code reader or a biometric sensor.

* * * * *